United States Patent
Kim et al.

(10) Patent No.: US 9,664,944 B2
(45) Date of Patent: May 30, 2017

(54) LIQUID CRYSTAL DISPLAY DEVICE AND METHOD OF FABRICATING THE SAME

(71) Applicant: Samsung Display Co., Ltd., Yongin (KR)

(72) Inventors: Hyang-Yul Kim, Yongin (KR); Seung-Hyun Park, Yongin (KR); Jung-Ho Park, Yongin (KR); Jean-Ho Song, Yongin (KR); Ji-Eun Lee, Yongin (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 14/745,059

(22) Filed: Jun. 19, 2015

(65) Prior Publication Data
US 2016/0116796 A1    Apr. 28, 2016

(30) Foreign Application Priority Data

Oct. 28, 2014  (KR) .................. 10-2014-0147700

(51) Int. Cl.
| | | |
|---|---|---|
| G02B 5/22 | (2006.01) | |
| G02B 1/10 | (2015.01) | |
| G02F 1/1335 | (2006.01) | |
| G02F 1/1343 | (2006.01) | |
| G02B 5/20 | (2006.01) | |

(52) U.S. Cl.
CPC ....... *G02F 1/133514* (2013.01); *G02B 5/201* (2013.01); *G02F 1/13439* (2013.01); *G02F 1/133516* (2013.01); *G02F 1/133553* (2013.01); *G02F 1/134309* (2013.01)

(58) Field of Classification Search
CPC ........ G02B 5/201; G02B 5/223; G02B 5/285; G02B 5/20; G02B 1/111; G02F 1/133514; G02F 1/133516; G02F 1/13394; G02F 1/1339; G02F 1/134309; G02F 1/13439; G02F 1/133553; G02F 2001/133936; G02F 2001/13398; G02F 1/133509
USPC ....... 359/885, 891, 892, 580, 584, 585, 587, 359/589
See application file for complete search history.

(56) References Cited

U.S. PATENT DOCUMENTS

| | | |
|---|---|---|
| 2003/0058390 A1 | 3/2003 | Fujii |
| 2004/0109105 A1 | 6/2004 | Nagakubo et al. |
| 2005/0276069 A1 | 12/2005 | Taniguchi et al. |
| 2006/0126686 A1 | 6/2006 | Suzuki |

(Continued)

FOREIGN PATENT DOCUMENTS

| | | |
|---|---|---|
| JP | 2002023154 | 1/2002 |
| JP | 2003255323 | 9/2003 |
| JP | 2005321693 | 11/2005 |

(Continued)

*Primary Examiner* — Jade R Chwasz
(74) *Attorney, Agent, or Firm* — Cantor Colburn LLP

(57) ABSTRACT

A liquid crystal display device includes an insulation substrate including a transmissive area and a reflective area, an organic layer positioned on the insulation substrate, and including a triangular pattern in the reflective area, a reflective electrode including reflective patterns corresponding to the triangular pattern of the organic layer in the reflective area, a color filter layer positioned on the reflective electrode, and including an opening for exposing a partial area of the reflective pattern, and a transparent layer disposed inside the opening of the color filter layer.

13 Claims, 10 Drawing Sheets

(56) References Cited

U.S. PATENT DOCUMENTS

2007/0024954 A1* 2/2007 Sakamoto ......... G02F 1/133514
                                                    359/296
2008/0316440 A1   12/2008 Iwanaga

FOREIGN PATENT DOCUMENTS

| JP | 2009176437       | 8/2009 |
| KR | 1020010067948    | 7/2001 |
| KR | 1020010069938    | 7/2001 |
| KR | 1020060079695    | 7/2006 |
| KR | 1020060080271 A  | 7/2006 |

* cited by examiner

LIQUID CRYSTAL DISPLAY DEVICE AND METHOD OF FABRICATING THE SAME

This application claims priority to Korean Patent Application No. 10-2014-0147700, filed on Oct. 28, 2014, and all the benefits accruing therefrom under 35 U.S.C. §119, the entire contents of which are incorporated herein by reference in their entirety.

BACKGROUND

1. Field

The invention relates to a liquid crystal display device and a method of manufacturing the same.

2. Description of the Related Art

A liquid crystal display ("LCD") device may be divided into a reflective LCD device for displaying by reflecting light incident from the outside, a transmissive LCD device using bottom-surface light, and a semi-transmissive LCD device which is capable of reducing power consumption, and securing visibility appropriate for surrounding luminosity for implementing a high quality image.

In the semi-transmissive LCD device, a reflective area including a reflective electrode and a transmissive area, which does not include a reflective electrode and includes a transparent electrode, are disposed within one pixel, and an image is displayed by reflecting external light in the reflective area, and an image is displayed by allowing light provided from a backlight unit to pass through in the transmissive area.

The semi-transmissive LCD device adopts a dual cell gap structure in which a cell gap in the transmissive area is adjusted to be two times a cell gap of the reflective area in order to secure uniform light efficiency emitting from the reflective area and the transmissive area and to improve a contrast ratio.

SUMMARY

The invention has been made in an effort to solve the above-described problems associated with the prior art, and provides a liquid crystal display ("LCD") device, in which a transparent layer and a reflective electrode having a specific pattern are disposed within a reflective area to improve efficiency of reflective light, and a method of manufacturing the same.

An exemplary embodiment of the invention provides an LCD device, including an insulation substrate including a transmissive area and a reflective area, an organic layer positioned on the insulation substrate, and including a triangular pattern in the reflective area, a reflective electrode including reflective patterns corresponding to the triangular pattern of the organic layer in the reflective layer, a color filter layer positioned on the reflective electrode, and including an opening for exposing a partial area of the reflective pattern, and a transparent layer disposed inside the opening of the color filter layer.

An exemplary embodiment of the invention provides a method of manufacturing an LCD device including an insulation substrate having a transmissive area and a reflective area, the method including forming an organic layer including a triangular pattern on the reflective area of the insulation substrate, forming a reflective electrode including reflective patterns corresponding to a triangular pattern of the organic layer on the organic layer, forming a transparent layer on some of the reflective patterns of the reflective electrode, and forming a color filter layer including an opening corresponding to the transparent layer on the insulation substrate.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
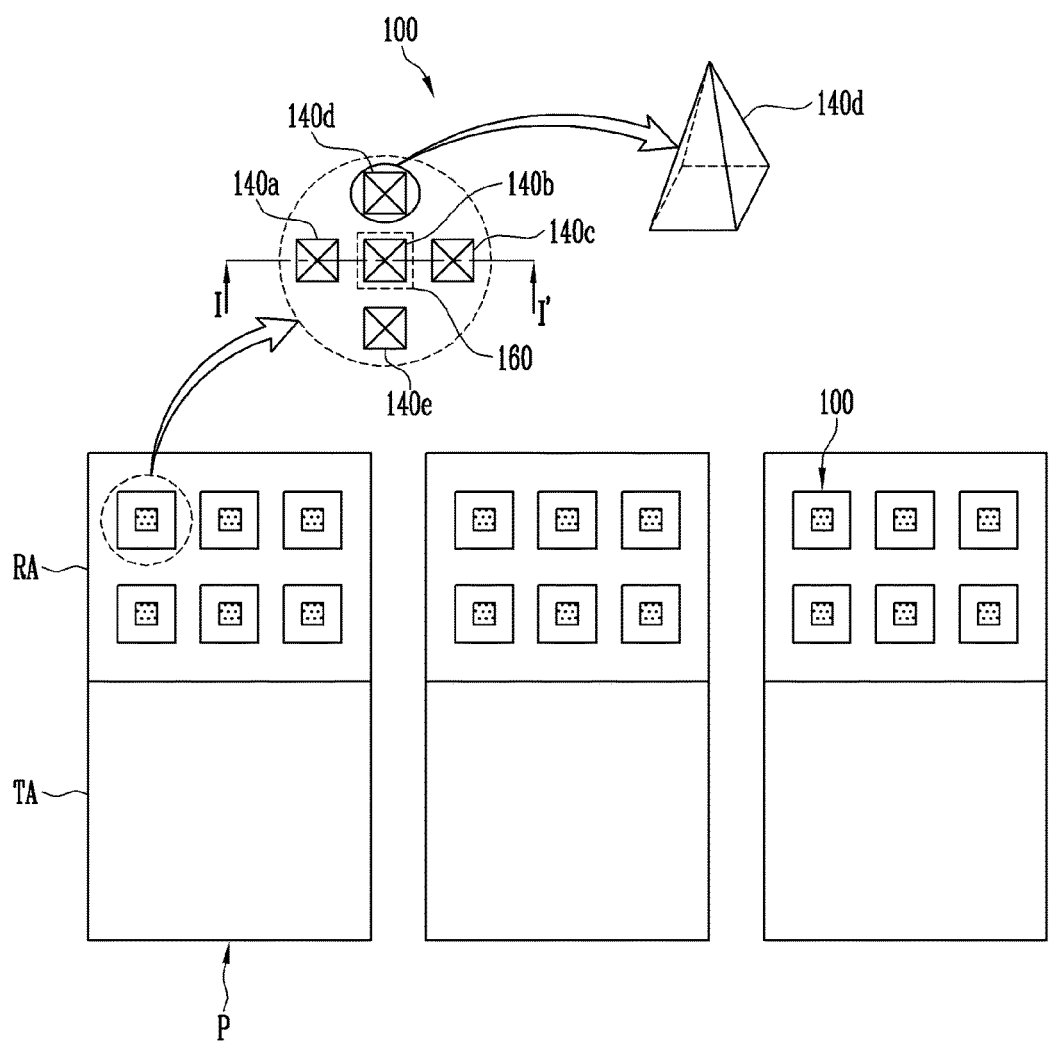
FIG. 1 is a diagram illustrating a pixel area of a first exemplary embodiment of a liquid crystal display ("LCD") device according to the invention.

Other detailed matters of the exemplary embodiments are included in the detailed description and the drawings.

Advantages and features of the invention and methods of achieving the advantages and features will be clear with reference to exemplary embodiments described in detail below together with the accompanying drawings.

However, the invention is not limited to the exemplary embodiments set forth below, and may be embodied in various other forms. The exemplary embodiments are for rendering the description of the invention complete and are set forth to provide a complete understanding of the scope of the invention to a person with ordinary skill in the technical field to which the invention pertains, and the invention will only be defined by the scope of the claims. Like reference numerals indicate like elements throughout the specification.

The size and thickness of the components shown the drawings are optionally determined for better understanding and ease of description, and the invention is not limited to the examples shown in the drawings.

In the drawings, thicknesses of several layers and regions are enlarged for clear expressions. In addition, in the drawings, for understanding and ease of description, the thicknesses of some layers and areas are exaggerated. When it is described that a certain part such as a layer, a film, a region and a plate is located on another part, it means that the certain part may be located directly on the another part and a third part may be interposed therebetween as well.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
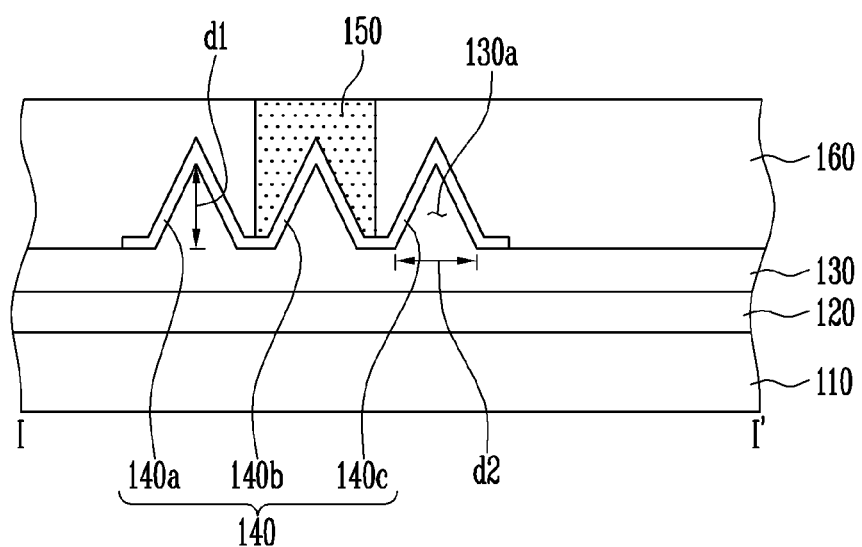
FIG. 2 is a cross-sectional view taken along line I-I' of FIG. 1.

FIG. 1 is a diagram illustrating a pixel area of a liquid crystal display ("LCD") device according to a first exemplary embodiment of the invention, and FIG. 2 is a cross-sectional view taken along line I-I' of FIG. 1.

Referring to FIGS. 1 and 2, a pixel area P of an LCD device according to a first exemplary embodiment of the invention includes a reflective area RA and a transmissive area TA.

The transmissive area TA allows light irradiated from a backlight unit (not shown) to pass through a liquid crystal layer to display an image, and the reflective area RA allows to light, such as, natural light, entering from the outside to reflective the light, and then allows the reflected light to pass through the liquid crystal layer to display an image.

The reflective area RA may include one or more reflection units 100. The reflection unit 100 includes an insulation substrate 110, an array layer 120 disposed on the insulation substrate 110, an organic layer 130 disposed on the array layer 120 and including a triangular pattern 130a, a reflective electrode 140 including first to fifth reflective patterns 140a to 140e corresponding to the triangular pattern 130a of the organic layer 130, a transparent layer 150 disposed on a part of the reflective electrode 140, and a color filter layer 160 provided in an area except for the transparent layer 150 on the insulation substrate 110.

The array layer 120 is defined on the insulation substrate 110, and includes a plurality of switching elements, e.g., thin film transistors ("TFTs"), and a passivation layer for protecting the plurality of switching elements TFTs. In an exemplary embodiment, the plurality of switching elements TFTs may include a gate electrode, a gate insulation layer, a semiconductor layer, a source electrode and a drain electrode, and the passivation layer may be provided as an inorganic insulation layer or an organic insulation layer, and a contact hole for exposing the drain electrode is defined in the passivation layer.

The organic layer 130 is disposed on the array layer 120, and is patterned so as to include the triangular pattern 130a in order to improve reflection efficiency of the reflective electrode 140 in the reflective area RA of each pixel area P. In an exemplary embodiment, the organic layer 130 may include a through-hole corresponding to the contact hole of the passivation layer, and include an organic material, for example, benzocyclobutene ("BCB"), polyethylene terephthalate ("PET"), or a photo acrylic resin.

The reflective electrode 140 corresponds to the reflective area RA and is defined on the triangular pattern 130a of the organic layer 130. The reflective electrode 140 includes the first to fifth reflective patterns 140a to 140e corresponding to the triangular pattern 130a, and the five reflective patterns 140a to 140e is configured as one bundle.

When a surface of the organic layer 130 has the triangular pattern 130a, the reflective electrode 140 disposed on the organic layer 130 includes the first to fifth reflective patterns 140a to 140e having a quadrangular pyramid shape so as to correspond to the same surface structure as that of the organic layer 130, and the first to fifth reflective patterns 140a to 140e increase the reflection quantity of light and improve a viewing angle.

In an exemplary embodiment, each of the first to fifth reflective patterns 140a to 140e may have a height d1 of about 2 micrometers (μm) and a width d2 of about 4 μm, and have a square pyramid shape as illustrated in FIG. 2.

In an exemplary embodiment, the reflective electrode 140 may include a metal, for example, aluminum (Al), an aluminum alloy (Al alloy), silver, or a silver alloy (Ag alloy), having excellent reflectivity.

The transparent layer 150 is defined on the second reflective pattern 140b positioned at a center among the first to fifth reflective patterns 140a to 140e of the reflective electrode 140. The transparent layer 150 enables external light to be directly irradiated to the reflective electrode 140, and may include a transparent insulating material, for example.

The color filter layer 160 including red, green and blue, one of which corresponds to one pixel electrode, is defined on an upper part of the reflective electrode 140, except for a part on which the transparent layer 150 is provided, and the transmissive area TA.

The color filter layer 160 is disposed on only the area except for the transparent layer 150, so that external light incident into the transparent layer 150 is directly transmitted to the reflective electrode 140, reflected to the color filter layer 160 by the reflective electrode 140, and finally transmitted to the liquid crystal layer.

As described above, since the external light incident into the transparent layer 150 is directly incident into the reflective electrode 140, it is possible to improve efficiency of reflective light compared to the case where light is partially absorbed within the color filter layer 160.

Particularly, when the transparent layer 150 is disposed on only the second reflective pattern 140b having the square pyramid shape, most of the reflective light moves in a front direction of the color filter layer 160 by the second reflective pattern 140b, thereby further improving efficiency of reflective light.

In the LCD device having a general semi-transmissive structure, while external light incident into the reflective area RA passes through the color filter layer 160 two times, light provided to the transmissive area TA passes through the color filter layer 160 one time. Accordingly, a colored degree is different, so that color purity is different between the reflective area RA and the transmissive area TA. That is, while the reflective area RA, in which the light passes through the color filter layer two times, has dark and thick color purity, the transmissive area TA, in which the light passes through the color filter layer one time, has bright and light color purity.

According to the exemplary embodiment of the invention, the external light incident into the transparent layer 150 and the reflective area RA by the reflective electrode 140 having the quadrangular pyramid shape is directly provided to the reflective electrode 140 through the transparent layer 150 and reflected to the color filter layer 160 by the reflective electrode 140.

Accordingly, since the external light incident into the reflective area RA passes through the color filter layer 160 only one time, the light provided from the backlight unit may be finally provided to the liquid crystal layer with the same color purity, similar to the transmissive area TA in which light passes through the color filter layer 160 one time.

FIGS. 3A to 3H are cross-sectional views sequentially illustrating a manufacturing process of a reflection part of FIG. 2.

Figure 3A:
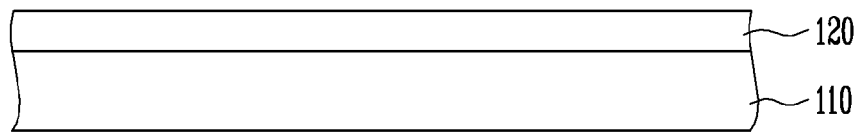
FIGS. 3A to 3H are cross-sectional views sequentially illustrating a manufacturing process of a reflection unit of FIG. 2.

Referring to FIG. 3A, the array layer 120 is disposed on the insulation substrate 110. Those skilled in the art may appropriately select a transparent substrate, such as glass, a flexible substrate, such as quartz, ceramic, silicon, and plastic, or the like as the substrate 110. The array layer 120 includes a plurality of switching elements TFTs, and a passivation layer for protecting the plurality of switching elements TFTs.

Figure 3B:
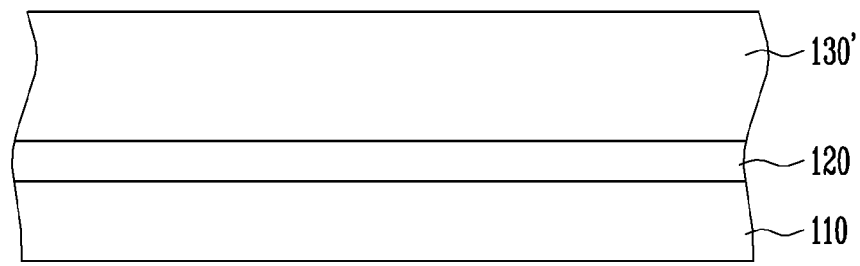

Next, referring to FIG. 3B, a photo sensitive organic material 130' is disposed on the entire surface of the insulation substrate 110 on which the array layer 120 is disposed.

In an exemplary embodiment, any one of BCB, PET, and photo acrylic resin may be selected as the photo sensitive organic material 130'.

Figure 3C:
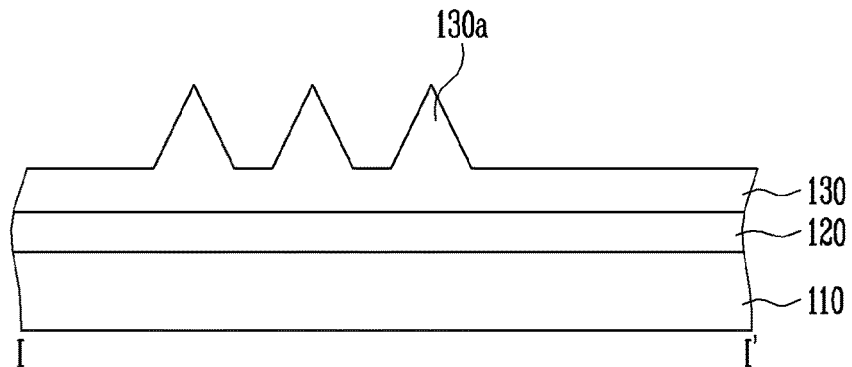

The organic layer 130 including the triangular pattern 130a is provided by disposing a mask (not shown) on the photo sensitive organic material 130' and then performing a mask process including a series of unit processes, such as exposure, development, and etching, as illustrated in FIG. 3C.

In an exemplary embodiment, the triangular pattern 130a of the organic layer 130 may be provided by a slit coating method or a spin coating method, for example. In another exemplary embodiment, the triangular pattern 130a may be provided by a mask process using a mask or a laminating method, for example. In an exemplary embodiment, the triangular pattern 130a of the organic layer 130 may have a regular triangular shape, for example.

Figure 3D:
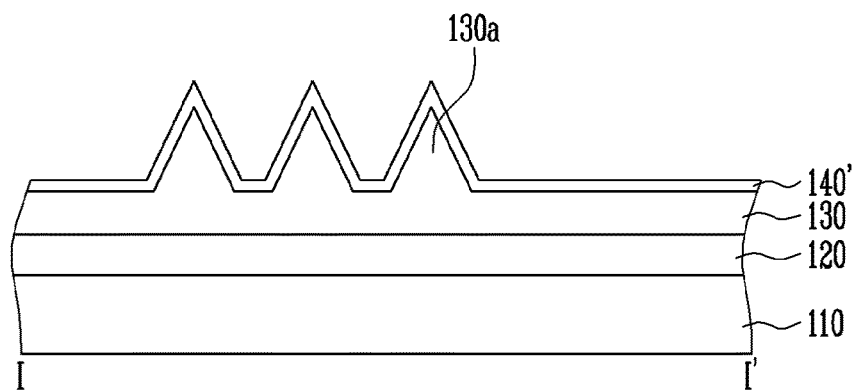

Next, referring to FIG. 3D, a conductive layer 140', such as silver (Ag) or aluminum (AL), having high reflectivity, is deposited on the organic layer 130 including the triangular pattern 130a.

Figure 3E:
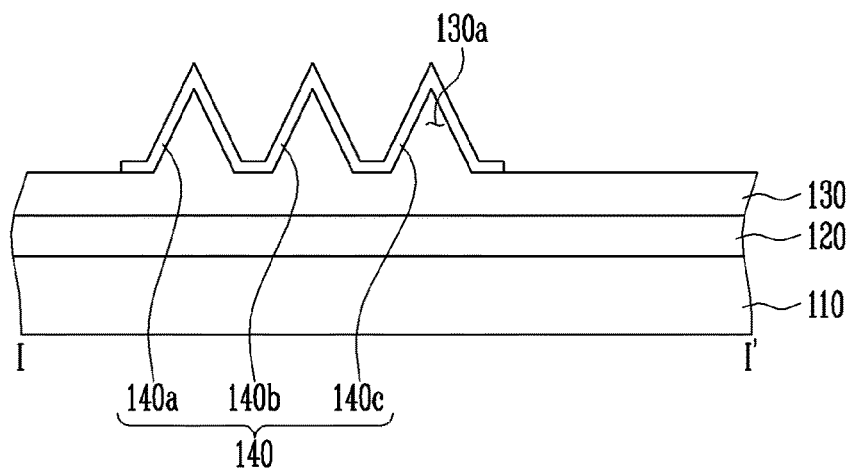

The conductive layer 140' is partially etched by a mask process using a mask, so that the reflective electrode 140 illustrated in FIG. 3E is disposed on the organic layer 130 corresponding to the reflective area RA. In an exemplary embodiment, the reflective electrode 140 includes the first to third reflective patterns 140a to 140c corresponding to the triangular pattern 130a of the organic layer 130.

Figure 3F:
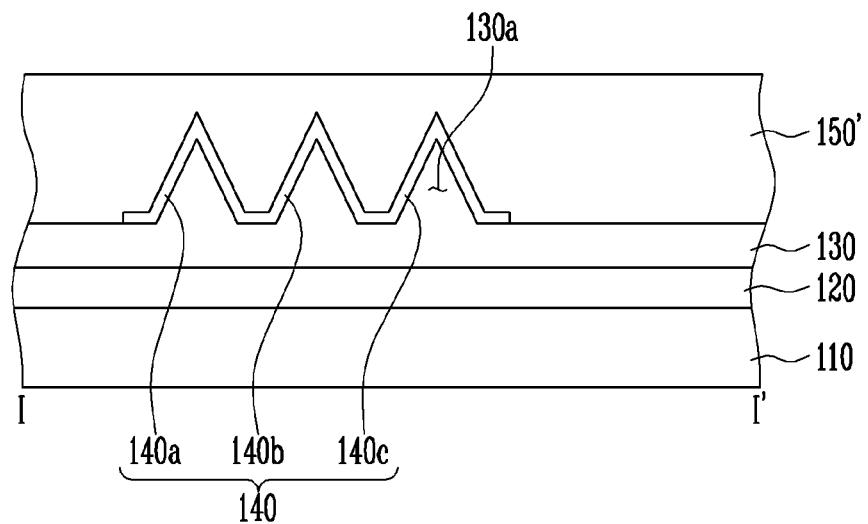

Subsequently, referring to FIG. 3F, a transparent insulating material layer 150' is disposed on the insulation substrate 110 on which the first to third reflective patterns 140a to 140c are disposed. In an exemplary embodiment, the transparent insulating material layer 150' may include an inorganic insulating material, such as a silicon oxide ($SiO_2$) layer and a silicon nitride layer (SiN), for example.

Figure 3G:
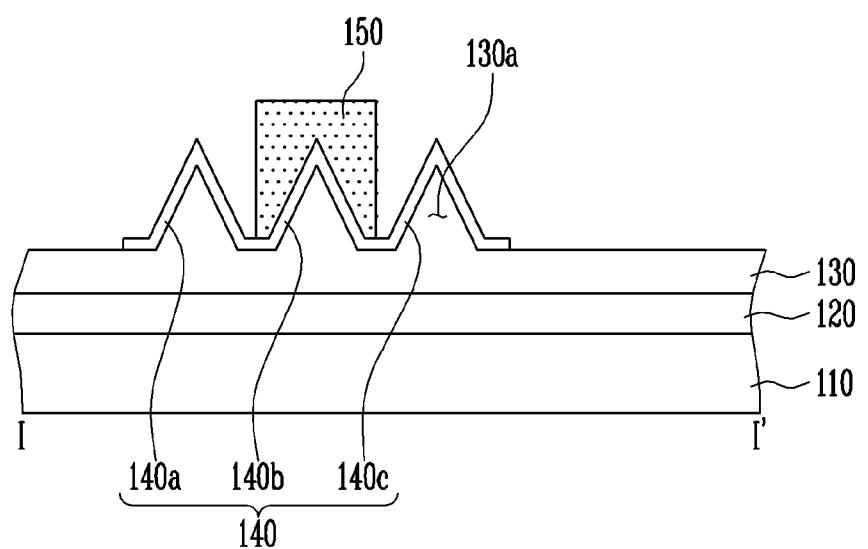

The transparent layer 150 illustrated in FIG. 3G is provided by disposing a mask on the insulation substrate 110, on which the transparent insulating material layer 150' is disposed, and then performing a mask process including a series of unit processes, such as exposure, development, and etching. In this case, the transparent layer 150 is disposed on only the second reflective pattern 140b.

Figure 3H:
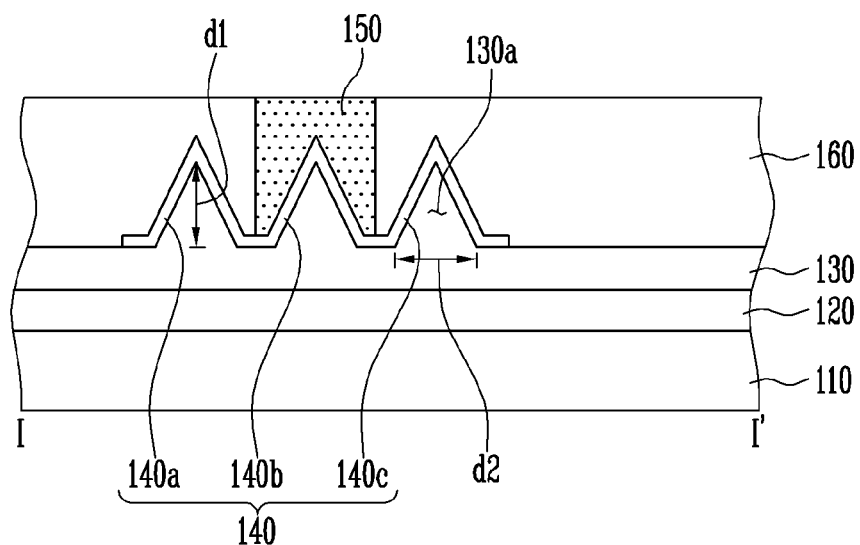

Referring to FIG. 3H, the color filter layer 160 is disposed on the insulation substrate 110, except for the transparent layer 150. The color filter layer 160 serves to determine a color of light, which passes through each pixel area P to be emitted, and may be configured of red, green and blue that are the three primary colors of light for each pixel area P, for example. In exemplary embodiments, the color filter layer 160 may be provided by various methods, such as a printing method using an ink jet printing device, a gravure printing method, a screen printing method, and a mask process method.

Since the color filter layer 160 is not disposed on the transparent layer 150, external light is directly transmitted to the second reflective pattern 140b through the transparent layer 150, and reflected to the color filter layer 160 by the second reflective pattern 140b, and finally transmitted to the liquid crystal layer.

Figure 4:
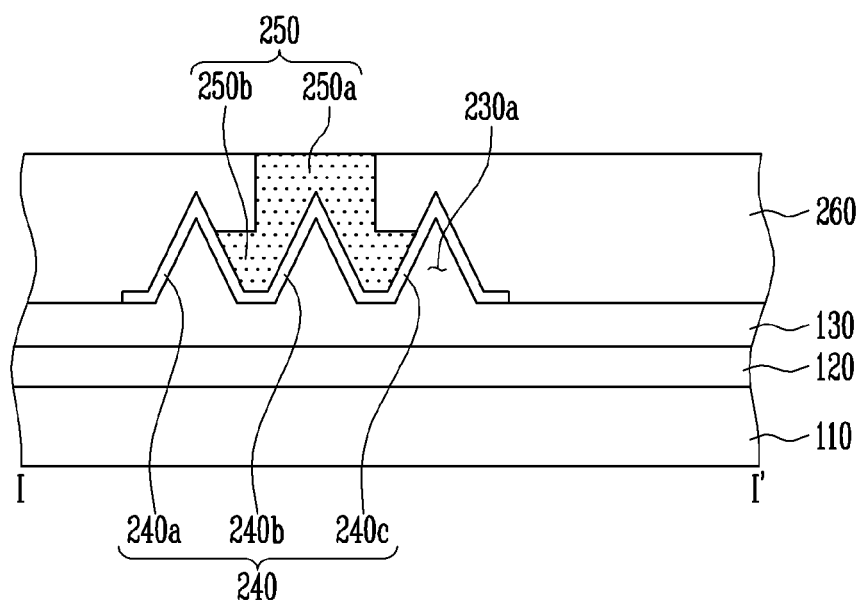
FIG. 4 is a cross-sectional view illustrating another exemplary embodiment of a transparent layer and a color filter of FIG. 2.

FIG. 4 is a cross-sectional view illustrating another exemplary embodiment of the transparent layer and the color filter of FIG. 2. The same reference numerals are assigned to the same constituent elements of the aforementioned exemplary embodiment, the same description is omitted, and differences will be mainly described.

Referring to FIG. 4, the reflection unit 100 includes an insulation substrate 110, an array layer 120 disposed on the insulation substrate 110, an organic layer 130 disposed on the array layer 120 and including a triangular pattern 230a, a reflective electrode 240 including first to third reflective patterns 240a to 240c corresponding to the triangular pattern 230a of the organic layer 130, a transparent layer 250 disposed on the first to third reflective patterns 240a to 240c, and a color filter layer 260 disposed on the organic layer 130 except for the transparent layer 250.

The transparent layer 250 may be divided into a first transparent layer 250a corresponding to the second reflective pattern 240b, and a second transparent layer 250b corresponding to some of the first and third reflective patterns 240a and 240c positioned around the second reflective pattern 240b.

In an exemplary embodiment, a thickness of the second transparent layer 250b may be about a half of a thickness of the first transparent layer 250a, and the color filter layer 260 is disposed on the second transparent layer 250b. Accordingly, in an exemplary embodiment, the color filter layer 260 disposed on the second transparent layer 250b may be thinner than the color filter layer 260 corresponding to the organic layer 130 on which the transparent layer 250 is not disposed.

The external light is directly provided to the second reflective pattern 240b through the first transparent layer 250a, moves to the first and third reflective patterns 240a and 240c, which are positioned around the second reflective pattern 240b, by the reflective pattern 240b, and is reflected to the color filter layer 260 by the first and third reflective patterns 240a and 240c.

In this case, since the color filter layer 260 corresponding to the second transparent layer 250b is substantially thin, an intensity of the reflective light passing through the color filter layer 260 may be increased. Accordingly, efficiency of the reflective light of the reflection unit 100 may be improved.

Figure 5:
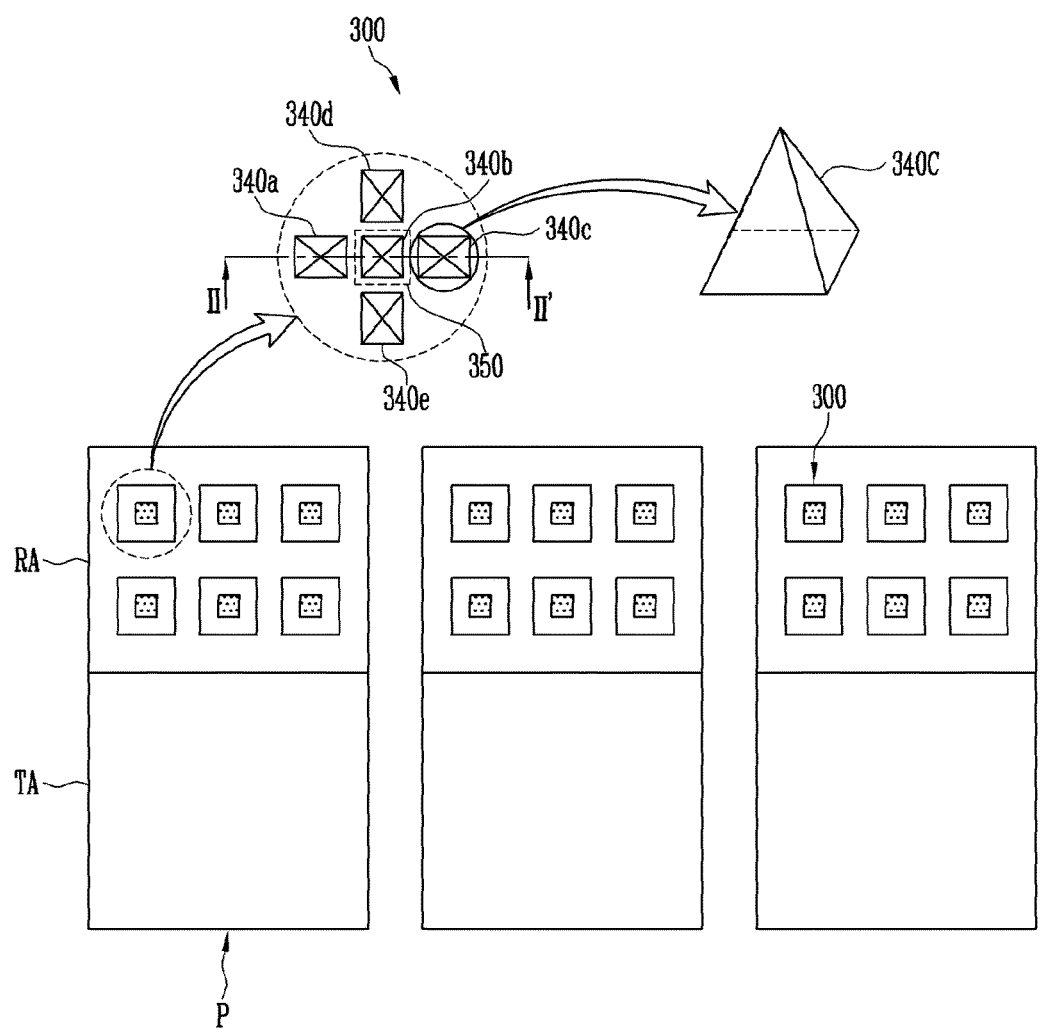
FIG. 5 is a diagram illustrating a pixel area of an LCD device according to a second exemplary embodiment of the invention.
Figure 6:
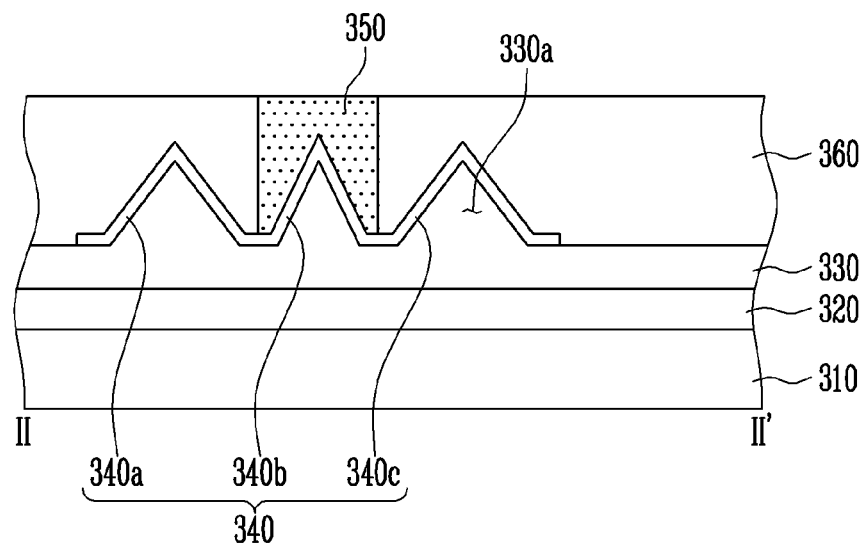
FIG. 6 is a cross-sectional view taken along line II-II' of FIG. 5.

FIG. 5 is a diagram illustrating a pixel area of an LCD device according to a second exemplary embodiment of the invention, and FIG. 6 is a cross-sectional view taken along line II-II' of FIG. 5.

Referring to FIGS. 5 and 6, a pixel area P of an LCD device according to a second exemplary embodiment of the invention includes a reflective area RA and a transmissive area TA.

The reflective area RA includes one or more reflection units 300. A reflection unit 300 includes an insulation substrate 310, an array layer 320 disposed on the insulation substrate 310, an organic layer 330 disposed on the array layer 320 and including a triangular pattern 330a, a reflective electrode 340 including first to fifth reflective patterns 340a to 340e corresponding to the triangular pattern 330a of the organic layer 330, a transparent layer 350 disposed on a part of the reflective electrode 340, and a color filter layer 360 disposed in an area except for the transparent layer 350 on the insulation substrate 310.

The reflective electrode 340 corresponds to the reflective area RA and is disposed on the triangular pattern 330a of the organic layer 330. The reflective electrode 340 includes the first to fifth reflective patterns 340a to 340e corresponding to the triangular pattern 330a, and the five reflective patterns 340a to 340e is configured as one bundle.

In an exemplary embodiment, the second reflective pattern 340b positioned at a center of the first to fifth reflective patterns 340a to 340e has a square pyramid shape, and the remaining reflective patterns 340a, 340c, 340d, and 340e positioned around the second reflective pattern 340b may have rectangular pyramid shapes, for example.

The reason is that the triangular pattern 330a of the organic layer 330 positioned under the second reflective pattern 340b has a regular triangular shape, and the triangular pattern 330a of the organic layer 330 positioned under the remaining reflective patterns 340a, 340c, 340d, and 340e has a right-angled triangular shape.

In an exemplary embodiment, a width of the second reflective pattern 340b may be about 4 µm, each of widths of the remaining reflective patterns 340a, 340c, 340d, and 340e may be about 5.2 µm, which is about 1.3 times of that of the second reflective pattern 340b.

In an exemplary embodiment, the reflective electrode 340 may include a metal, for example, aluminum (Al), an aluminum alloy (Al alloy), silver, or a silver alloy (Ag alloy), having excellent reflectivity.

The transparent layer 350 is disposed on the second reflective pattern 340b positioned at a center among the first to fifth reflective patterns 340a to 340e of the reflective electrode 340. The transparent layer 350 enables external light to be directly irradiated to the reflective electrode 340, and may include a transparent insulating material, for example.

The color filter layer 360 including red, green and blue, one of which corresponds to one pixel electrode, is disposed on an upper part of the reflective electrode 340, except for a part on which the transparent layer 350 is disposed, and the transmissive area TA.

The color filter layer 360 is disposed on only the area except for the transparent layer 350, so that external light incident into the transparent layer 350 is directly transmitted to the reflective electrode 340, reflected to the color filter layer 360 by the reflective electrode 340, and finally transmitted to the liquid crystal layer.

As described above, since the external light incident into the transparent layer 350 is directly incident into the reflective electrode 340, it is possible to improve efficiency of reflective light compared to the case where light is partially absorbed within the color filter layer 360.

The external light directly provided to the second reflective pattern 340b is provided to the remaining reflective patterns 340a, 340c, 340d, and 340e by the second reflective pattern 340b, and passes through the color filter layer 360 in a side direction by the rectangular pyramid shapes of the remaining reflective patterns 340a, 340c, 340d, and 340e.

Figure 7:
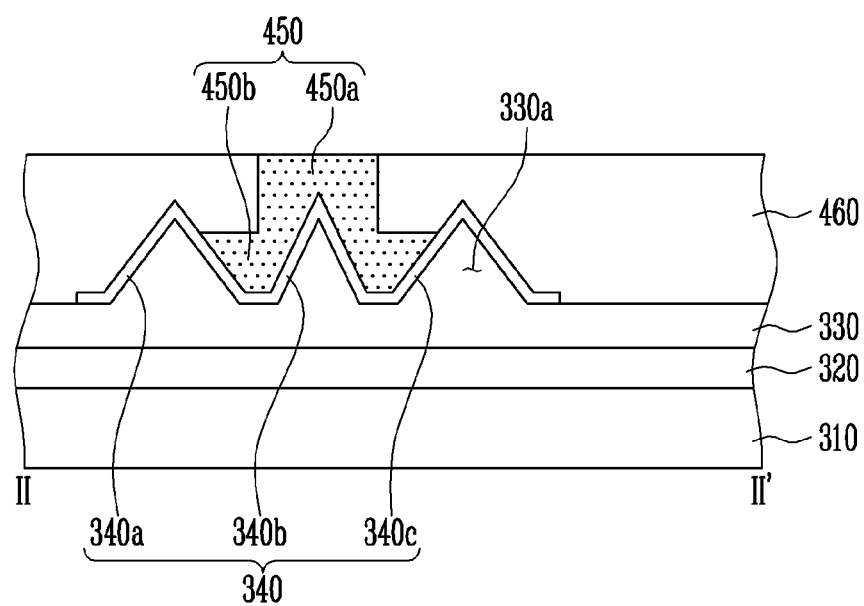
FIG. 7 is a cross-sectional view illustrating another exemplary embodiment of a transparent layer and a color filter of FIG. 6.

FIG. 7 is a cross-sectional view illustrating another exemplary embodiment of the transparent layer and the color filter of FIG. 6. The same reference numerals are assigned to the same constituent elements of the aforementioned exemplary embodiment, the same description is omitted, and differences will be mainly described.

Referring to FIG. 7, the reflection unit 300 includes an insulation substrate 310, an array layer 320 disposed on the insulation substrate 310, an organic layer 330 disposed on the array layer 320 and including a triangular pattern 330a, a reflective electrode 340 including first to third reflective patterns 340a to 340c corresponding to the triangular pattern 330a of the organic layer 330, a transparent layer 450 disposed on the first to third reflective patterns 340a to 340c, and a color filter layer 460 disposed on the organic layer 330 except for the transparent layer 450.

The transparent layer 450 may be divided into a first transparent layer 450a corresponding to the second reflective pattern 340b, and a second transparent layer 450b corresponding to some of the first and third reflective patterns 340a and 340c positioned around the second reflective pattern 340b.

In an exemplary embodiment, a thickness of the second transparent layer 450b may be about a half of a thickness of the first transparent layer 450a, and the color filter layer 460 is disposed on the second transparent layer 450b. Accordingly, in an exemplary embodiment, the color filter layer 460 disposed on the second transparent layer 450b may be thinner than the color filter layer 460 corresponding to the organic layer 330 on which the transparent layer 450 is not disposed.

The external light is directly provided to the second reflective pattern 340b through the first transparent layer 450a, moves to the first and third reflective patterns 340a and 340c, which are positioned around the second reflective pattern 340b, by the reflective pattern 340b, and is reflected to the color filter layer 460 by the first and third reflective patterns 340a and 340c.

In this case, since the color filter layer 460 corresponding to the second transparent layer 450b is thin, an intensity of the reflective light passing through the color filter layer 460 may be increased. Accordingly, efficiency of the reflective light of the reflection unit 300 may be improved.

Figure 8:
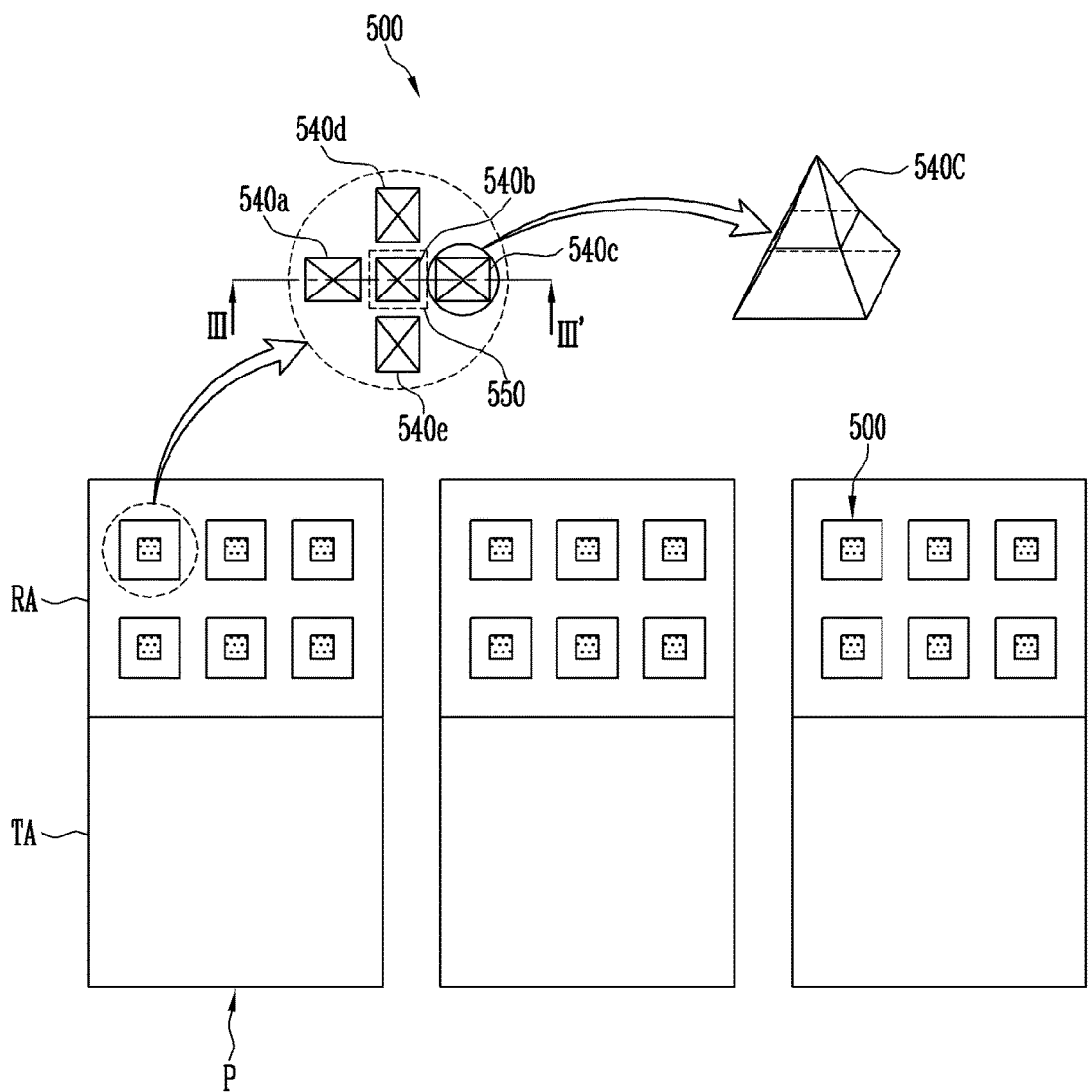
FIG. 8 is a diagram illustrating a pixel area of an LCD device according to a third exemplary embodiment of the invention.
Figure 9:
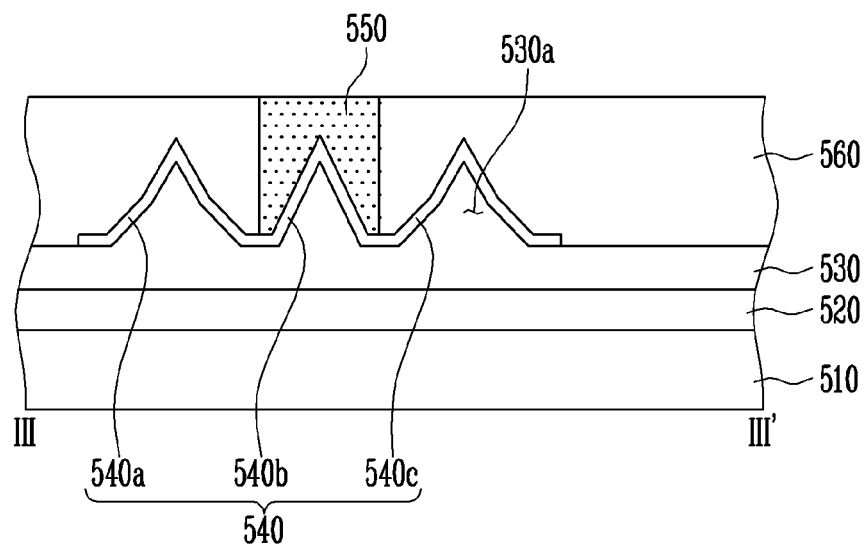
FIG. 9 is a cross-sectional view taken along line III-III' of FIG. 8.

FIG. 8 is a diagram illustrating a pixel area of an LCD device according to a third exemplary embodiment of the invention, and FIG. 9 is a cross-sectional view taken along line III-III' of FIG. 8.

Referring to FIGS. 8 and 9, a pixel area P of an LCD device according to a third exemplary embodiment of the invention includes a reflective area RA and a transmissive area TA.

The reflective area RA may include one or more reflection units 500. The reflection unit 500 includes an insulation substrate 510, an array layer 520 disposed on the insulation substrate 510, an organic layer 530 disposed on the array layer 520 and including a triangular pattern 530a, a reflective electrode 540 including first to fifth reflective patterns 540a to 540e corresponding to the triangular pattern 530a of the organic layer 530, a transparent layer 550 disposed on a part of the reflective electrode 540, and a color filter layer 560 disposed in an area except for the transparent layer 550 on the insulation substrate 510.

The reflective electrode 540 corresponds to the reflective area RA and is disposed on the triangular pattern 530a of the organic layer 530. The reflective electrode 540 includes the first to fifth reflective patterns 540a to 540e corresponding to the triangular pattern 530a of the organic layer 530, and the five reflective patterns 540a to 540e is configured as one bundle.

In an exemplary embodiment, the second reflective pattern 540b positioned at a center of the first to fifth reflective patterns 540a to 540e has a square pyramid shape, and the remaining reflective patterns 540a, 540c, 540d and 540e positioned around the second reflective pattern 540b may have two-layered rectangular pyramid shapes.

The reason is that the triangular pattern 530a of the organic layer 530 positioned under the second reflective pattern 540b has a regular triangular shape, and the triangular pattern 530a of the organic layer 530 positioned under the remaining reflective patterns 540a, 540c, 540d and 540e has a dual right-angled triangular shape, in which a square pyramid is laid on the rectangle shaped like a trapezoid.

In an exemplary embodiment, a width of the second reflective pattern 540b may be about 4 μm, widths of the remaining reflective patterns 540a, 540c, 540d and 540e may be about 5.2 μm, which is about 1.3 times of that of the second reflective pattern 540b.

The transparent layer 550 is disposed on the second reflective pattern 540b positioned at a center among the first to fifth reflective patterns 540a to 540e of the reflective electrode 540. The transparent layer 550 enables external light to be directly irradiated to the reflective electrode 540, and may include a transparent insulating material.

The color filter layer 560 including red, green and blue, one of which corresponds to one pixel electrode, is disposed on an upper part of the reflective electrode 540, except for a part on which the transparent layer 550 is provided, and the transmissive area TA.

The color filter layer 560 is disposed on only the area except for the transparent layer 550, so that external light incident into the transparent layer 550 is directly transmitted to the reflective electrode 540 and incident into the color filter layer 560 by the reflective electrode 540, thereby improving efficiency of reflective light compared to the case where light is partially absorbed within the color filter layer 560.

The external light directly provided to the second reflective pattern 540b is provided to the remaining reflective patterns 540a, 540c, 540d and 540e by the second reflective pattern 540b, and passes through the color filter layer 560 in a side direction by the rectangular pyramid shapes of the remaining reflective patterns 540a, 540c, 540d, and 540e.

Figure 10:
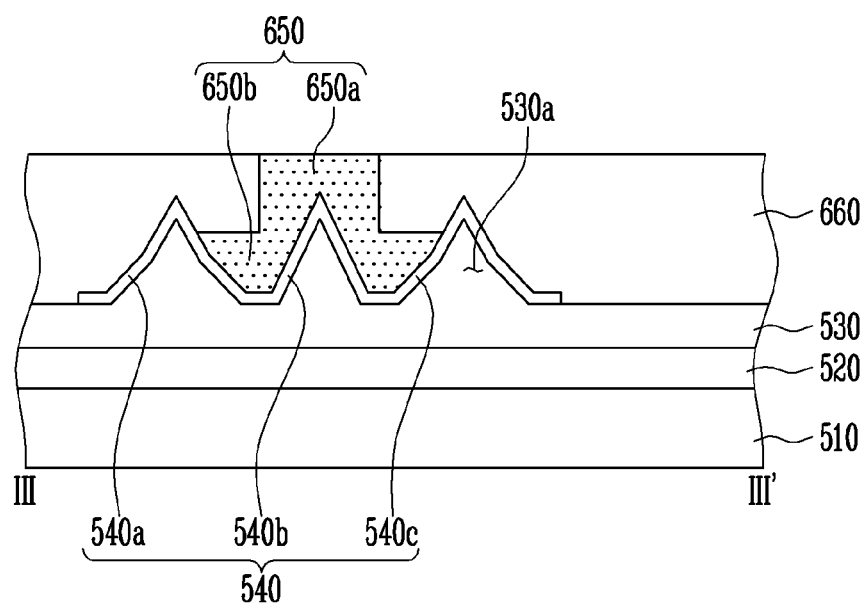
FIG. 10 is a cross-sectional view illustrating another exemplary embodiment of a transparent layer and a color filter of FIG. 9.

FIG. 10 is a cross-sectional view illustrating another exemplary embodiment of the transparent layer and the color filter of FIG. 9. The same reference numerals are assigned to the same constituent elements of the aforementioned exemplary embodiment, the same description is omitted, and differences will be mainly described.

Referring to FIG. 10, the reflection unit 500 (see FIG. 8) includes an insulation substrate 510, an array layer 520 disposed on the insulation substrate 510, an organic layer 530 disposed on the array layer 520 and including a triangular pattern 530a, a reflective electrode 540 including first to third reflective patterns 540a to 540c corresponding to the triangular pattern 530a of the organic layer 530, a transparent layer 650 disposed on the first to third reflective patterns 540a to 540c, and a color filter layer 660 disposed on the organic layer 530 except for the transparent layer 650.

The transparent layer 650 may be divided into a first transparent layer 650a corresponding to the second reflective pattern 540b, and a second transparent layer 650b corresponding to some of the first and third reflective patterns 540a and 540c positioned around the second reflective pattern 540b.

In an exemplary embodiment, a thickness of the second transparent layer 650b may be about a half of a thickness of the first transparent layer 650a, and the color filter layer 660 is disposed on the second transparent layer 650b. Accordingly, in an exemplary embodiment, the color filter layer 660 disposed on the second transparent layer 650b may be thinner than the color filter layer 660 disposed on the organic layer 530 on which the transparent layer 650 is not provided.

The external light is directly provided to the second reflective pattern 540b through the first transparent layer 650a, moves to the first and third reflective patterns 540a and 540c, which are positioned around the second reflective pattern 540b, by the reflective pattern 540b, and is reflected to the color filter layer 660 by the first and third reflective patterns 540a and 540c.

In this case, since the color filter layer 660 corresponding to the second transparent layer 650b is thin, an intensity of the reflective light passing through the color filter layer 660 may be increased. Accordingly, efficiency of the reflective light of the reflection unit 500 may be improved.

Figure 11:
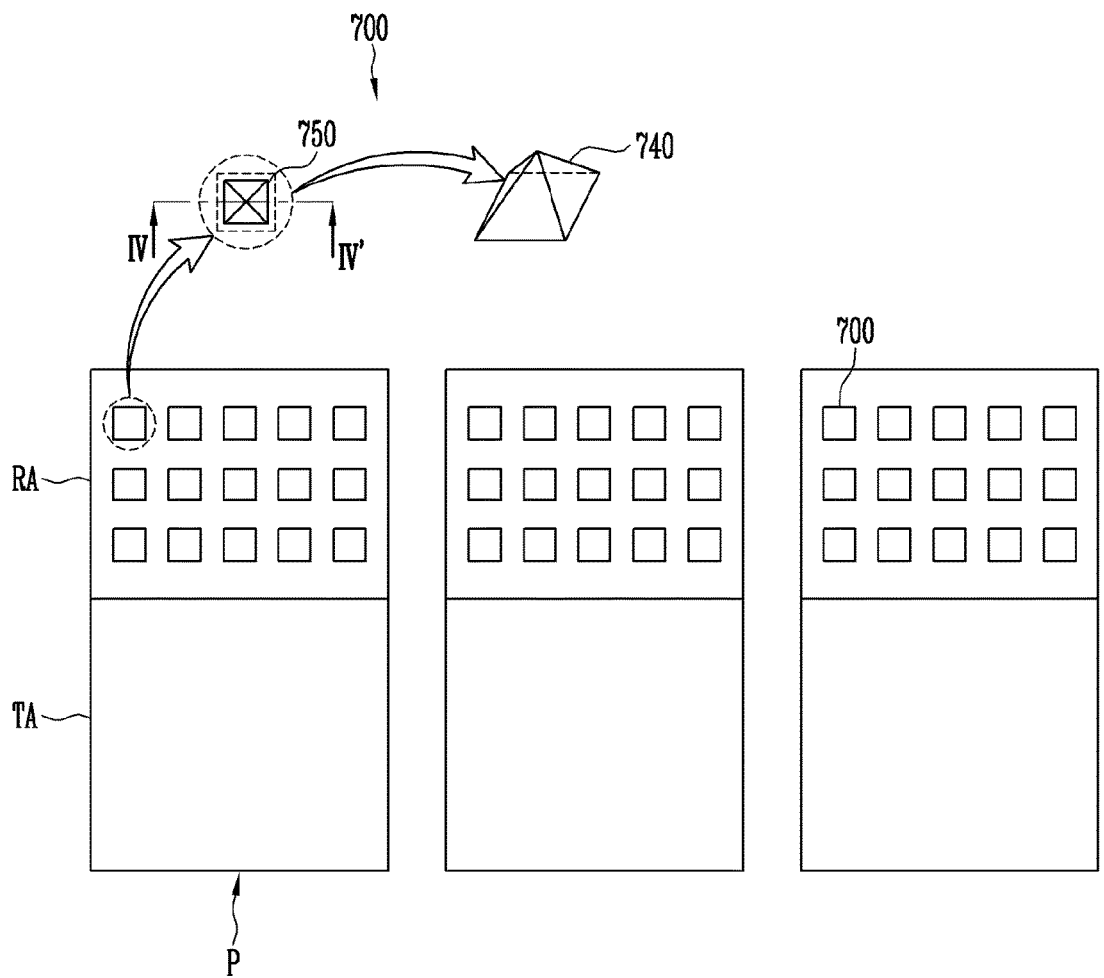
FIG. 11 is a diagram illustrating a pixel area of an LCD device according to a fourth exemplary embodiment of the invention.
Figure 12:
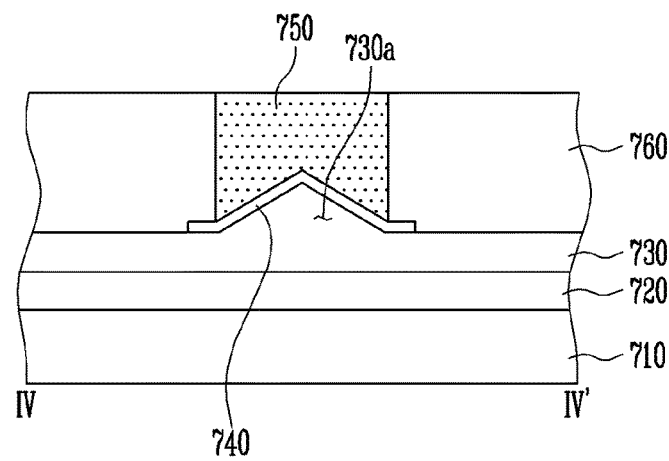
FIG. 12 is a cross-sectional view taken along line IV-IV' of FIG. 11.

FIG. 11 is a diagram illustrating a pixel area of an LCD device according to a fourth exemplary embodiment of the invention, and FIG. 12 is a cross-sectional view taken along line IV-IV' of FIG. 11.

Referring to FIGS. 11 and 12, a pixel area P of an LCD device according to a fourth exemplary embodiment of the invention includes a reflective area RA and a transmissive area TA.

The transmissive area TA allows light irradiated from a backlight unit (not shown) to pass through a liquid crystal layer to display an image, and the reflective area RA allows to light, such as, natural light, entering from the outside to reflective the light, and then allows the reflected light to pass through the liquid crystal layer to display an image.

The reflective area RA may include one or more reflection units 700. A reflection unit 700 includes an insulation substrate 710, an array layer 720 disposed on the insulation substrate 710, an organic layer 730 disposed on the array layer 720 and including a triangular pattern 730*a*, a reflective electrode 740 corresponding to the triangular pattern 730*a* of the organic layer 730, a transparent layer 750 disposed on the reflective electrode 740, and a color filter layer 760 provided in an area except for the transparent layer 750 on the insulation substrate 710.

The organic layer 730 is disposed on the array layer 720, and is patterned so as to include the triangular pattern 730*a* in order to improve reflection efficiency of the reflective electrode 740 in the reflection area RA of each pixel area P.

The reflective electrode 740 corresponds to the reflective area RA and is disposed on the triangular pattern 730*a* of the organic layer 730.

When a surface of the organic layer 730 has the triangular pattern 730*a*, the reflective electrode 740 disposed on the organic layer 730 has a quadrangular pyramid shape corresponding to the same surface structure as that of the organic layer 730, so that the amount of reflection of external light is increased and a viewing angle is improved.

The reflective electrode 740 may include a metal, for example, aluminum (Al), an aluminum alloy (Al alloy), silver, or a silver alloy (Ag alloy), having excellent reflectivity.

The transparent layer 750 is disposed on the reflective electrode 740. The transparent layer 750 enables external light to be directly irradiated to the reflective electrode 740, and may include a transparent insulating material.

The color filter layer 760 including red, green and blue, one of which corresponds to one pixel electrode, is disposed on the organic layer, except for a part on which the transparent layer 750 is disposed.

The color filter layer 760 is disposed on only the area except for the transparent layer 750, so that external light incident into the transparent layer 750 is directly transmitted to the reflective electrode 740, reflected to the color filter layer 760 by the reflective electrode 740, and finally transmitted to the liquid crystal layer.

As described above, since the external light incident into the transparent layer 750 is directly incident into the color filter layer 760, it is possible to improve efficiency of reflective light compared to the case where light is partially absorbed within the color filter layer 760.

By way of summation and review, in a semi-transmissive LCD device having a Color Filter On Array ("COA") structure in which the pixel electrode and the color filter are disposed on the same substrate in order to prevent an alignment error between a color filter and a pixel electrode, it is not easy to implement a dual cell gap having a step between liquid crystal layers in a reflective area and a transmissive area.

Particularly, external light passes through the color filter layer and is transmitted to the reflective electrode in the reflective area of the semi-transmissive LCD device having the COA structure, passes through the color filter layer by the reflective electrode, and is reflected to the liquid crystal layer.

External light passes through the color filter layer two times in the reflective area to be finally provided to the liquid crystal layer, and light provided from the backlight unit passes through the color filter layer one time in the transmissive layer to be provided to the liquid crystal layer.

As described above, external light passes through a color filter two times in the reflective area, and internal light passes through the color filter one time in the transmissive area, so that color reproducibility is different between the reflective area and the transmissive area. Further, the color filter includes color pixels colored with different colors, so that a difference in color visibility and luminance may be generated in each color pixel.

As described above, the LCD device according to the invention includes the reflective electrode including the reflective patterns shaped like a quadrangular pyramid shape, the transparent layer corresponding to some of the reflective patterns, and the color filter layer disposed on the area except for the transparent layer, so that external light is directly incident to the reflective electrode and finally passes through the color filter layer in the reflective area one time, thereby improving efficiency of reflective light of the reflective area.

Further, the LCD device according to the invention may implement uniform color reproducibility for each pixel area by making light efficiency of the reflective area be similar to light efficiency of the transmissive area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:
1. A liquid crystal display device, comprising:
an insulation substrate including a transmissive area and a reflective area;
an organic layer positioned on the insulation substrate, and including a triangular pattern in the reflective area;
a reflective electrode including reflective patterns corresponding to the triangular pattern of the organic layer in the reflective area;
a color filter layer which is positioned on the reflective electrode, and in which an opening for exposing a partial area of a reflective pattern of the reflective patterns is defined therethrough the color filter layer; and
a transparent layer disposed inside the opening extending through the color filter layer.

2. The liquid crystal display device of claim 1, wherein the reflective pattern has a quadrangular pyramid shape.

3. The liquid crystal display device of claim 1, wherein at least one reflective electrode is disposed in the reflective area in a form in which five reflective patterns of the reflective patterns are grouped into one bundle.

4. The liquid crystal display device of claim 3, wherein the opening of the color filter layer exposes a center reflective pattern among the five reflective patterns.

5. The liquid crystal display device of claim 4, wherein the transparent layer further includes a first transparent layer corresponding to the center reflective pattern and a second transparent layer corresponding to some of four reflective patterns of the five reflective patterns surrounding the center reflective pattern.

6. The liquid crystal display device of claim 5, wherein a width of the center reflective pattern is different from widths of the four reflective patterns surrounding the center reflective pattern.

7. The liquid crystal display device of claim 3, wherein the five reflective patterns of the reflective electrode have the same width.

8. The liquid crystal display device of claim 1, wherein the transparent layer includes a transparent insulation layer.

9. A method of manufacturing a liquid crystal display device including an insulation substrate having a transmissive area and a reflective area, the method comprising:

forming an organic layer including a triangular pattern on the reflective area of the insulation substrate;

forming a reflective electrode including reflective patterns corresponding to a triangular pattern of the organic layer on the organic layer;

forming a transparent layer on some of the reflective patterns of the reflective electrode; and forming a color filter layer in which an opening corresponding to the transparent layer is defined therethrough the color filter layer on the insulation substrate and the transparent layer is disposed inside the opening of the color filter layer.

10. The method of claim 9, wherein the reflective pattern has a quadrangular pyramid shape.

11. The method of claim 9, wherein at least one reflective electrode is disposed in the reflective area in a form in which five reflective patterns of the reflective patterns are grouped into one bundle.

12. The method of claim 11, wherein the opening of the color filter layer exposes a center reflective pattern among the five reflective patterns.

13. The method of claim 12, wherein the transparent layer further includes a first transparent layer corresponding to the center reflective pattern and a second transparent layer corresponding to some of the four reflective patterns surrounding the center reflective pattern.

* * * * *